United States Patent [19]

Harris et al.

[11] Patent Number: 4,908,399

[45] Date of Patent: Mar. 13, 1990

[54] ENCAPSULATING COMPOSITIONS

[75] Inventors: Stephen J. Harris; Maureen G. MacManus, both of Dublin; John Guthrie, County Kildare, all of Ireland

[73] Assignee: Loctite (Ireland) Ltd., Dublin, Ireland

[21] Appl. No.: 270,136

[22] Filed: Nov. 14, 1988

Related U.S. Application Data

[60] Continuation of Ser. No. 100,494, Sep. 24, 1987, abandoned, and a continuation-in-part of Ser. No. 88,945, Aug. 24, 1987, which is a continuation-in-part of Ser. No. 914,491, Oct. 2, 1986, Pat. No. 4,718,966, which is a division of Ser. No. 776,536, Sep. 16, 1985, Pat. No. 4,636,539, which is a division of Ser. No. 673,621, Nov. 21, 1984, Pat. No. 4,556,700, said Ser. No. 100,494, is a continuation-in-part of Ser. No. 870,677, Jun. 4, 1986, Pat. No. 4,699,966, which is a continuation-in-part of Ser. No. 717,251, Mar. 28, 1985, Pat. No. 4,642,362.

[30] Foreign Application Priority Data

Sep. 29, 1986 [IE] Ireland ............................ 2567/86

[51] Int. Cl.$^4$ ............................................ C08L 23/00
[52] U.S. Cl. .................................. 524/243; 524/244; 524/265; 524/266; 524/370; 524/376; 524/375; 524/285; 524/288; 524/289; 524/290; 524/292; 524/383; 524/391; 524/385; 524/481; 524/482; 524/487; 524/488; 524/523; 524/533; 525/477; 525/474
[58] Field of Search ............... 524/243, 244, 265, 366, 524/370, 376, 375, 285, 288, 289, 290, 292, 383, 391, 385, 481, 482, 487, 488, 523, 533; 525/477, 474

[56] References Cited

U.S. PATENT DOCUMENTS

| | | | |
|---|---|---|---|
| 4,159,976 | 7/1979 | Moran | 260/33.4 EP |
| 4,259,464 | 3/1981 | Buriks et al. | 525/480 |
| 4,271,425 | 6/1981 | Wong | 357/72 |
| 4,278,784 | 7/1981 | Wong | 528/27 |
| 4,528,081 | 7/1985 | Lien et al. | 204/159.13 |
| 4,617,336 | 10/1986 | Pastor et al. | 524/291 |
| 4,636,539 | 1/1987 | Harris et al. | 523/214 |
| 4,642,362 | 2/1987 | Harris et al. | 556/446 |
| 4,668,713 | 5/1987 | Woods et al. | 522/174 |
| 4,699,802 | 10/1987 | Nakos et al. | 427/54.1 |
| 4,699,966 | 10/1987 | Harris et al. | 528/12 |

FOREIGN PATENT DOCUMENTS 60-90277  5/1985  Japan .

OTHER PUBLICATIONS

Harper, A. H., "Embedding", Encyclopedia of Chemical Technology Kirk-Othmer, vol. 8, pp. 877–899, J. Wiley & Sons, 1979.
Ungaro, et al., "New Ionizable Ligands from p.t-Butylcalix[4]arene" Journal of Inclusion Phenomena 2, pp. 199–206, 1984.
Gutsche, D. C., "The Calixarenes", Topics in Current Chemistry, 123 pp. 1–47, 1984.
Streitwieser, Jr. et al. *Introduction to Organic Chemistry*, 2nd ed, (1981) p. 643, Macmillan Publishing Co. Inc, New York.

*Primary Examiner*—Melvyn I. Marquis
*Attorney, Agent, or Firm*—Vidas & Arrett

[57] ABSTRACT

An encapsulating composition for electronic devices comprises a curable material such as an epoxy resin and an ion scavenger compound selected from certain calixarene or oxycalixarene compounds in which at least half of the phenolic groups have been substituted by specific groups and certain silacrown compounds. Exemplary ion scavenger compounds include

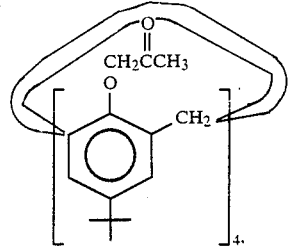

the tetraethyl acetate of 7, 13, 19, 25-tetra-tertbutyl-27, 28, 29, 30-tetrahydroxy-2,3-dihomo-3-oxacalix-4-arene and 1,1-dimethasila-17-crown-6.

11 Claims, No Drawings

ENCAPSULATING COMPOSITIONS

This is a continuation of U.S. patent application Ser. No. 100,494, filed Sept. 24, 1987, now abandoned, which is a continuation-in-part of U.S. patent application Ser. No. 870,677, filed Jun. 4, 1986, now U.S. Pat. No. 4,699,966, which is a continuation-in-part of U.S. patent application Ser. No. 717,251, filed Mar. 28, 1985, now U.S. Pat. No. 4,642,362, which is a continuation-in-part of U.S. patent application Ser. No. 673,621, filed Nov. 21, 1984, now U.S. Pat. No. 4,556,700. This is also a continuation-in-part of U.S. patent application Ser. No. 088,945, filed Aug. 24, 1987, now allowed, which is a continuation-in-part of U.S. patent application Ser. No. 914,491, filed Oct. 2, 1986, now U.S. Pat. No. 4,718,966, which is a division of U.S. patent application Ser. No. 766,536, filed Sept. 16, 1985, now U.S. Pat. No. 4,636,539, which is a division of U.S. patent application Ser. No. 673,621, filed Nov. 21, 1984, now U.S. Pat. No. 4,556,700.

BACKGROUND OF THE INVENTION

1. Field of the Invention

This invention relates to encapsulating compositions for electronic devices such as semiconductor devices, integrated circuits and microelectronic components.

2. Description of the Related Art

Resin compositions, particularly based on silicone resins or epoxy resins, are well known for encapsulating electronic devices. It is also well known that such compositions are often contaminated by trace amounts of metal ions, particularly alkali metal ions. If such metal ions are permitted to migrate in the composition, they can adversely affect the performance of the electronic device and may ultimately lead to device failure. Chloride ions can also give rise to a corrosion problem.

It has been suggested to incorporate a crown ether or cryptate ether in such compositions as metal ion scavengers (U.S. Pat. Nos. 4271425 and 4278784 of Ching-Ping Wong, referring to Japanese Patent No. 76-11377 of Kaneda et. al.). However crown ethers and cryptate ethers are unsuitable for commercial use because of their high toxicity.

U.S. Pat. No. 4556700 of S. Harris et. al. describes the use in adhesive compositions of calixarene compounds represented by the formula

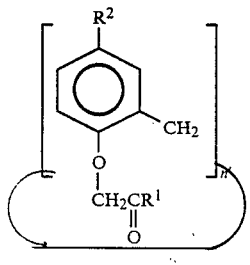

where $R^1$ is alkyl, alkoxy, substituted alkyl or substituted alkoxy; $R^2$ is H or alkyl; and $n'=4,6$ or 8. It had previously been suggested to use crown ethers as accelerators in these compositions.

McKervey et. al., J. Chem. Soc. Commun. 1985 p. 388 describes the cation transfer properties of alkyl calixaryl acetates. These ester calixarenes are known to be capable of sequestering alkali metals. However the behavior of calixarene derivatives in the environment of an encapsulating composition could not be predicted. The present inventors have found that certain calixarene derivatives can scavenge alkali metal ions so efficiently that an epoxy resin which would not normally be regarded as useful for electronic applications can be converted to a material having a relatively low level of contamination.

The same paper by McKervey et. al. compares the selectivity towards alkali metal picrates of alkyl calixaryl acetates, 18-crown-6, and a silacrown. The results published in that paper suggest that the silacrown is substantially less efficient for ion transport and has low sodium sequestering ability, as compared to the calixarene derivatives and 18-crown-6. We have now unexpectedly found that silacrowns have a level of activity comparable to 18-crown-6 and calixarene derivatives as alkali metal ion scavengers in encapsulating compositions. This illustrates the unpredictable nature of metal scavenging ability in encapsulating compositions. We have identified a range of compounds which are suitable as metal ion scavengers in such compositions.

SUMMARY OF THE INVENTION

The present invention provides an encapsulating composition for electronic devices which comprises a polymeric material and a metal ion scavenger selected from (A) Calixarene or oxacalixarene derivatives represented by the formula

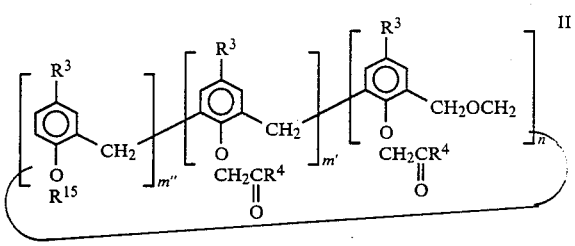

wherein
$m'+m''=0-8$;
$n=0-8$;
$m' \geq \frac{1}{2}(m'+m'')$;
$3 \leq m'+m''+n \leq 8$;
if $n=0$, $m'+m'' \geq 4$;
$R^3$ is H, halogen, or hydrocarbyl, or a substituted derivative thereof, and $R^3$ may be the same or different on each aryl group;
$R^4$ is hydrocarbyl, hydrocarbyloxy or a substituted derivative thereof; or
$R^4$ is

wherein $R^5$ and $R^6$ which may be the same or different are H, or hydrocarbyl or a substituted derivative thereof;

$R^{15}$ is H or hydrocarbyl or a substituted derivative thereof;

the calixarene or oxacalixarene derivative being present as a compound per se or being bound into the polymer network of the polymeric material;

(B) Silacrowns represented by the formula

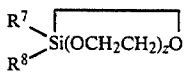

wherein $R^7$ and $R^8$ which may be the same or different are hydrocarbyl, hydrocarbyloxy, or a nitrogen-substituted or other substituted derivative thereof; z is 3-6; and (C) Polyalkylene ether glycols and ether derivatives thereof represented by the formula IV, V, VI or VII below:

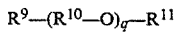

wherein
q is an integer of from 2 to 3000;
$R^{10}$ is a substituted or unsubstituted alkyl residue having 2 to 6 carbon atoms; the ($R^{10}$—O) groups containing the same alkyl residue or containing 2 or more different alkyl residues which may be distributed on the chain in a random or block manner;
$R^{11}$ is hydrogen, or hydrocarbyl or a substituted derivative thereof;
$R^9$ is hydroxy, or hydrocarbyloxy or a substituted derivative thereof;

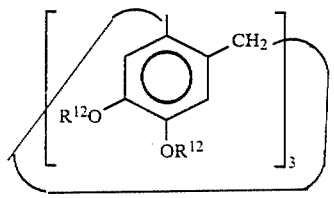

wherein $R^{12}$ is —($R^{10}$—O)$_q$—$R^{11}$ in which $R^{10}$, $R^{11}$ and q are as defined above;

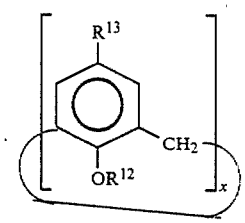

wherein
$R^{12}$ is as defined above;
$R^{13}$ is hydrogen, halogen, or hydrocarbyl or a substituted derivative thereof; and
x is an integer from 4 to 8;

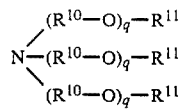

wherein $R^{10}$, $R^{11}$ and q are as defined above.

Exemplary of hydrocarbyl groups there may be given alkyl, alkenyl, aryl and moieties having both non-aryl hydrocarbyl and aryl hydrocarbyl portions. Exemplary of hydrocarbyloxy groups there may be given non-aryl containing hydrocarbyloxy, aryloxy and oxy moieties having both non-aryl hydrocarbyl and aryl hydrocarbyl portions.

The metal ion scavenger is added in an effective amount which may suitably be from 0.5 to 10% by weight, based on the polymeric material.

A polymeric material having a calixarene derivative of formula II above incorporated into the polymer network is preferably of the kind described in European patent application No. 0196895A2 which describes, inter alia, polyorganosiloxanes having at least one calixarene group bound thereto. For example, a trialkoxysilyl calixarene derivative of the formula:

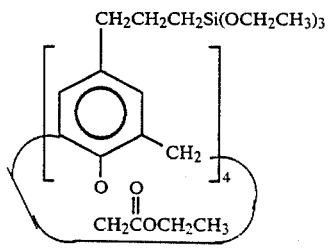

may be used to crosslink polydimethylsiloxanediol in the presence of a tin salt so that it is incorporated into the cured RTV silicone network. A calixarene derivative bound into a polymer network has the advantage that it cannot leach out during the working life of the encapsulating composition.

In the above compounds of formula II–VII, the non-aryl hydrocarbyl or hydrocarbyloxy groups shall preferably contain from 1 to 10 carbon atoms, more preferably from 1 to 5 carbon atoms and the aromatic hydrocarbyl and aromatic hydrocarbyloxy groups shall preferably have from 6 to 20 carbon atoms, more preferably from 6 to 10 carbon atoms. Non-aryl hydrocarbyl groups are preferred, especially alkyl or alkenyl groups. A substituted derivative of the foregoing may suitably be substituted with one or more halo groups or substituted or interrupted by one or more oxo groups. Halogen may be chlorine, bromine, fluorine or iodine.

The preferred calixarene or oxacalixarene derivatives of formula II are those in which m″=0.

The preparation of calixarene derivatives is known and is described, for example, in C. Gutsche et. al. Acc. Chem. Res., 16, 161-170 (1983); in U.S. Pat. No. 4556700 Harris et al., and in J. Inclusion Phenomena 2 199-206 (1984) D. Reidel Publishing Company.

The preparation of aryl calixarene derivatives including those of formula XIII, XIV, XV, XVI and XVII below is described in European patent application No. 87306963.7 and equivalent applications in other countries.

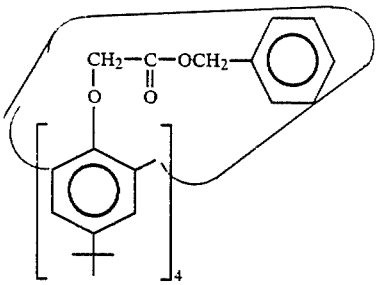

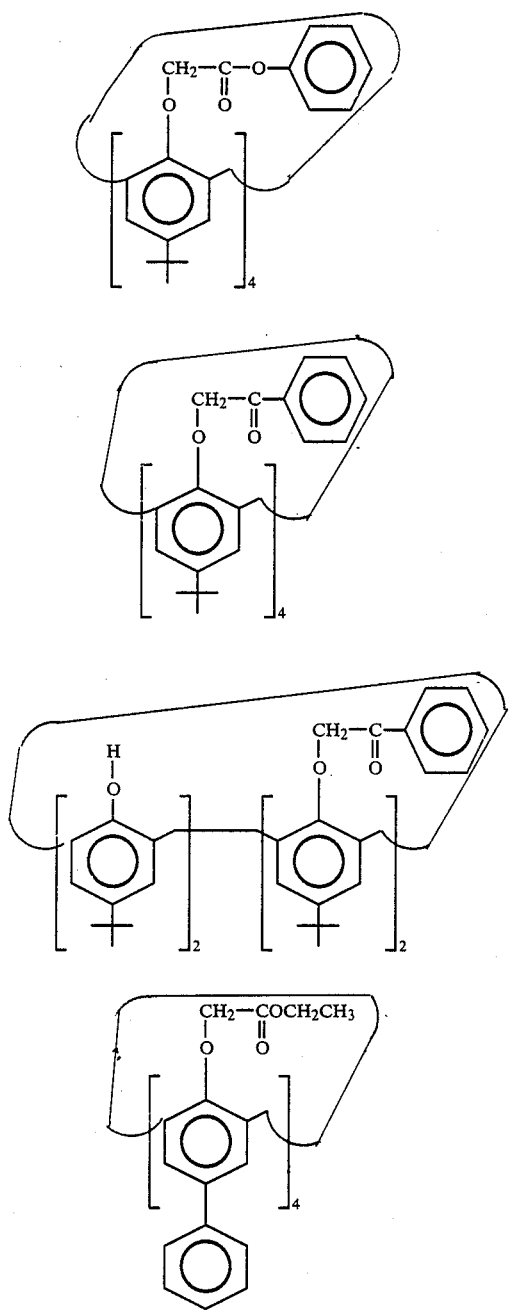

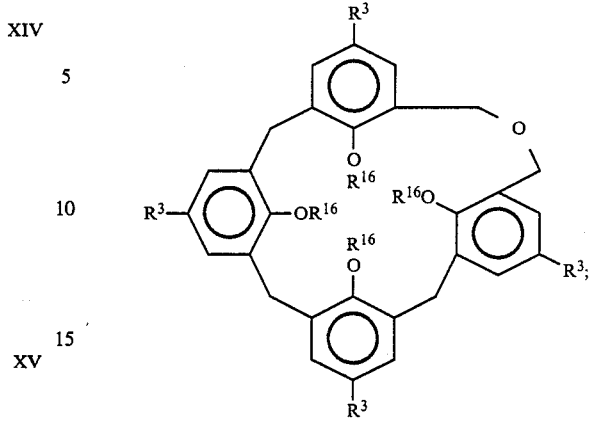

(ii) a dioxacalix-4-arene of formula

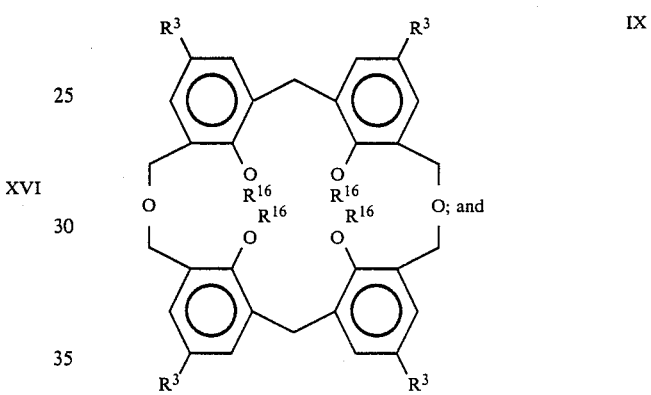

(iii) a trioxcalix-3-arene of formula:

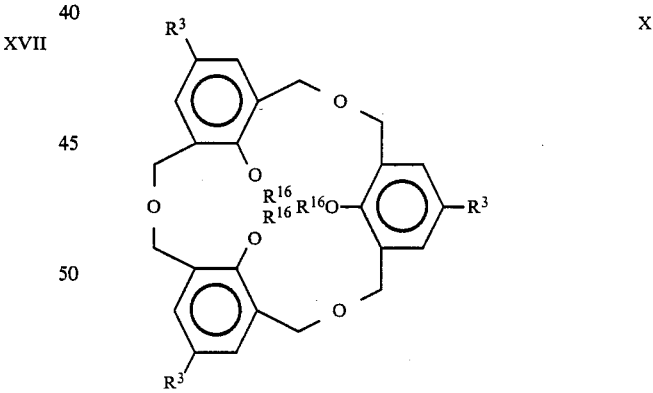

Mixed functionality calixarene derivatives (i.e. wherein n=0 and m" 1) are described in European patent application No. 0196895A2 and U.S. Pat. No. 4642363 Harris et. al. When m" is greater than or equal to 2, the aryl groups having the —O—$R^{15}$ side chain may be interspersed around the ring between the aryl groups having the —OCH$_2$C (O) $R^4$ side chain.

In the oxacalixarene derivatives of formula II when (m'+m") and n are greater than 2, the methyl and ether bridges may or may not alternate within the oxacalixarene molecule.

Preferred etherified oxacalixarenes of formula II are (i) an oxacalix-4-arene of formula wherein $R^{16}$ is —CH$_2$C(O) $R^4$, and $R^3$ and $R^4$ are as defined above.

Oxacalixarene compounds may be readily synthesised by methods described in C. Gutsche et. al., J. AM. Chem. Soc. 103, 3782 (1981); B. Dhawan et al., J. Org. Chem., 48, 1536 (1983) and U.S. Pat. No. 4 098 717 Buriks et al.

Etherified oxacalixarenes of formula II may be produced by reacting a phenolic oxacalixarene with a halomethyl acetone or a haloalkyl acetate. Potassium iodide may be added to accelerate etherification. This method of production and the etherified oxacalixarenes of formula II are the subject of Irish patent application No. 153/87 filed 21 Jan. 1987.

Amide-functional calixarenes and oxacalixarenes of formula II may be prepared by methods described in G. Calestani et al., J. Chem. Soc., Chem. Commun., 1987, 344. The amide-functional oxacalixarene derivatives are novel compounds and are covered in an Irish patent application No. 2574/87 entitled "Nitrogen-containing Oxacalixarenes and Calixarene Derivatives and use of such Compounds" filed 24 Sept. 1987.

Silacrowns of formula III are commercially available, e.g. from Petrarch Systems, Bristol, Pa., U.S.A. Suitable silacrowns and the preparation thereof are described in B. Arkles et al., "Silacrowns, a New Class of Immobilizable Phase Transfer Catalysts", American Chemical Society Symposium Series No. 192 - Chemically Modified Surfaces in Catalysis and Electrocatalysis, (Joel S. Miller, editor) 1982; and in Organometallics, Vol. 2, No. 3, 1983, 454. Suitable silacrowns include 1,1-dimethylsila-11-crown-4, 1,1-dimethylsila-14-crown-5, and 1,1-dimethylsila-17-crown-6.

Polyalkylene ether glycols and ether derivatives thereof are commercially available or can be prepared by well known procedures. In the compounds of formula IV, V or VI, the value of q is preferably in the range 2–25, more especially 3–6. Compounds of formula V and VI are covered in our Irish patent application No. 204/87 filed 27 Jan. 1987. Calixarene derivatives of formula VI may be prepared by the processes described in the literature already mentioned above. Cyclotriveratrylene compounds of formula V may be synthesised as described in J. A. Hyatt, J. Org. Chem. 43 1808–1811 (1978), the contents of which are incorporated herein by reference.

Compounds of formula VII may be prepared as described in "Tris(polyoxaalkyl)amines (Tridents), a New Class of solid-liquid Phase-Transfer Catalysts", G. Soula, J. Org. Chem., Vol. 50, No. 20, 1985, p. 3717.

The polymeric material may be any of the resins known for encapsulating compositions, particularly silicone resins such as RTV silicone resins, and epoxy resins, see for example U.S. Pat. Nos. 4 271 425 and 4 278 784 and Japanese Pat. No. 76-11377.

The metal ion scavengers in the compositions of the present invention have a substantial advantage over crown ethers in commercial use because they are of low toxicity.

DESCRIPTION OF THE PREFERRED EMBODIMENTS

The invention is illustrated in the following Examples.

EXAMPLE 1.

To 32.4 g (0.049 mole) p-t-butylcalix-4-arene was added 60.0 g (0.435 mole) pulverised anhydrous potassium carbonate, 33.2 g (0.200 mole) pulverised anhydrous potassium iodide and 80.0 g (0.865 mole) chloroacetone and 1.5 l dry analar acetone and the entire was refluxed for 17 hr. under dry nitrogen with stirring. The cooled reaction mixture was then added to 9 liters of water and the product precipitated as an off-white solid. This solid was then washed well with 5% aqueous sodium thiosulphate followed by water after which it was dissolved in dichloromethane and this organic phase washed with 5% aqueous potassium hydroxide, then water and then 5% aqueous hydrochloric acid, followed by water. The organic phase was then dried over dried magnesium sulphate and the dichloromethane distilled off, the last traces at reduced pressure to give 35.3 g of off white powdered product. Two recrystallisations from methoxyethanol afforded 18.0 g of colourless crystalline product m.pt. 201°–201.5° C. which was characterised by i.r. and elemental analysis as

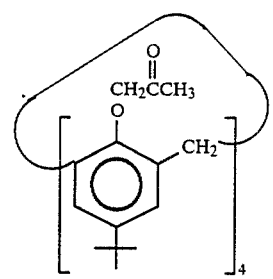

i.r. spectroscopy results: $\nu$ 1720(S)cm$^{-1}$-C=O
Elemental analysis: (Calc'd for the compound of formula XIX: $C_{56}H_{72}O_8 \cdot C_3H_8O_2$ C: 74.56, H: 8.50; Found, C: 74.23, H: 8.82)

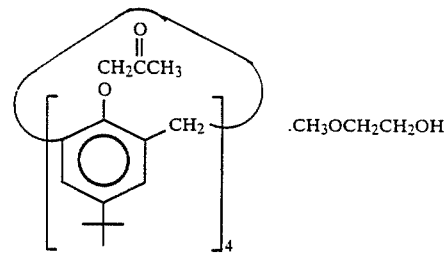

EXAMPLE 2.

To 100 g of epoxy resin ERL 4221 Electronic Grade (E.G.) which is commercially available from Union Carbide Corporation, Danbury, Conn., U.S.A. and which is believed to be 3,4-epoxycyclohexyl methyl cyclohexanecarboxylate, was added 1 g of the calixarene derivative of Example 1. The composition was stirred well in a polyethylene beaker with PTFE-coated stirrer for 17 hours to effect complete dissolution.

EXAMPLE 3.

A formulation of 100 g of epoxy resin Quatrex 1010 which is commercially available from The Dow Chemical Company, Midland, Mich., U.S.A. and which is believed to be diglycidyl ether of Bisphenol A (low hydrolysable chloride level), and 1 g of the calixarene derivative of Example 1 was prepared as above in Example 2.

EXAMPLE A (Comparative)

A formulation consisting of 100 g epoxy resin ERL 4221 EG and 1 g of 18-crown-6 was prepared as in Example 2.

EXAMPLE B (Comparative)

A formulation consisting of 100 g epoxy Quatrex 1010 and 1 g of 18-crown-6 was prepared as in Example 3.

EXAMPLE 4

To 10 g of the formulation of Example 2 was added 8 g of anhydride AC-DP-1 (which is commercially available from Anhydrides and Chemicals Incorporated, N.Y., U.S.A. and which is believed to be methyl tetrahydro phthalic anhydride) and the mixture was well stirred and then placed in a PTFE mould and cured for 15 minutes at 175° C. The cooled cured epoxy was then mechanically finely ground (100 mesh).

EXAMPLE C (Comparative)

To 10 g of the formulation of Example A was added 8 g of anhydride AC-DP-1 and the same procedure followed as in Example 4.

EXAMPLE D (Comparative)

Example 4 was followed except that no additive was used with ERL 4221 E.G.

EXAMPLE 5

To 10 g of the formulation of Example 3 was added 2.5 g poly(oxypropylene) diamine (Commercially available under the Trade Mark Jeffamine D-230 from Texaco Chemical Company, Bellaire, Tex., U.S.A.) and the composition was stirred well and then placed in a PTFE mould and cured for 15 minutes at 120° C. The cooled cured epoxy was then mechanically finely ground (100 mesh).

EXAMPLE E (Comparative)

To 10 g of the formulation of Example B was added 2.5 g of poly(oxypropylene) diamine and the same procedure was followed as for Example 5.

EXAMPLE F (Comparative)

To 10 g of Quatrex 1010 without any additive was added 2.5 g poly(oxypropylene)diamine and the procedure of Example 5 was followed.

TEST RESULTS—TABLE I

The ionic impurities in the products of Examples 4 and 5 and C, D, E, and F were measured following a procedure given in "Development of Microelectronic Adhesives to meet the new U.S. Military Hybrid Adhesive Specifications" MIL-A-87172 by D. M. Shenfield (Ablestik Laboratories—Subsidiary of National Starch and Chemical Corporation, Gardena, Calif., U.S.A.) in "5th European Hybrid Microelectronics Conference 1985 Stresa, Italy", page 428—"Ionic impurities". Thus 3 grams of powdered samples of the products of Examples 4, 5 C, D, E and F were refluxed with 150 g of deionised water for 20 hours. The procedure was carried out in triplicate and a blank was also prepared. These samples of water were then analysed for sodium and potassium ion content by atomic absorption and chloride ion content by titration. The following results (expressed in parts per million) were obtained:

| Sample | Analysis of Aqueous Samples (p.p.m.) | | | | |
|---|---|---|---|---|---|
| | Additive | Epoxy | $Na^+$ | $K^+$ | $Cl^-$ |
| Example 4 | 1% Calixarene derivative of Example 1 | ERL 4221 +anhydride AC-DP-1 | 18 | 9 | <1 |
| Example C | 1% 18-crown-6 | ERL 4221 +anhydride AC-DP-1 | 17 | 8 | <1 |
| Example D | 0 | ERL 4221 +anhydride AC-DP-1 | 45 | 10 | <1 |
| Example 5 | 1% Calixarene derivative of Example 1. | Quatrex 1010 +Jeffamine-D230 | 23 | <5 | <1 |
| Example E | 1% 18-crown-16 | Quatrex 1010 +Jeffamine-D230 | 22 | 5 | <1 |
| Example F | 0 | Quatrex 1010 +Jeffamine-D230 | 38 | <5 | <1 |

As can be clearly seen, the calixarene derivative of Example 1 gives similar performance to 18-crown-6 in reducing extractable sodium and potassium from cured epoxy resin when used as a 1% level additive.

EXAMPLE G (Comparative)

To 100 g of epoxy resin diglycidyl ether of Bisphenol A (Epikote 828 non-electronic epoxy resin commercially available from Shell Chemical Company—Batch G) was added 25 g of poly(oxypropylene) diamine (Jeffamine D-230) and the procedure of Example 5 was followed.

EXAMPLE 6

To 100 g Epikote 828 (Batch 5) was added 1 g of a calixarene derivative of the formula:

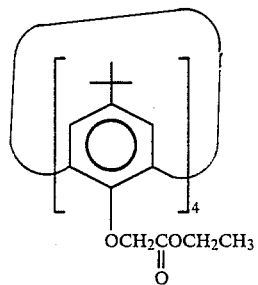

$$OCH_2\underset{\underset{O}{\|}}{C}OCH_2CH_3$$

prepared as described in U.S. Pat. No. 4,556,700 by S. Harris et al. The composition was stirred well at room temperature in a polyethylene beaker with PTFE-coated stirrer for 17 hours to effect complete dissolution. To 10 g of the formulation was added 2.5 g of poly(oxypropylene)diamine and the same procedure was followed as for Example 5.

EXAMPLE H (Comparative)

To 100 g Epikote 828 (Batch G) was added 1 g of 18-crown-6 and the formulation was stirred as in Example 6. To 10 g of the formulation was added 2.5 g of poly(oxypropylene)diamine and the same procedure was followed as for Example 5.

TEST RESULTS—TABLE II

The ionic impurities in the products of Examples 6, G and H were measured following the MIL-A-87172 procedure described above to give the following results:

| Sample | Analysis of Aqueous Samples (p.p.m.) | | | | |
|---|---|---|---|---|---|
| | Additive | Epoxy | $Na^+$ | $K^+$ | $Cl^-$ |
| Example G | 0 | Epikote 828 + Jeffamine D-230 | 240 | 16 | 9 |
| Example 6 | 1% Calixarene derivative | Epikote 828 + | 30 | 10 | 3 |

| | Analysis of Aqueous Samples (p.p.m.) | | | | |
|---|---|---|---|---|---|
| Sample | Additive | Epoxy | $Na^+$ | $K^+$ | $Cl^-$ |
| Example H | 1% 18-crown-6 | Jeffamine D-230 Epikote 828 + Jeffamine D-230 | 50 | 15 | 6 |

This indicates the potential of an ordinary non electronic epoxy product being converted into an epoxy for use in electronic encapsulation by addition of a calixarene derivative.

Also the calixarene derivative is significantly better than 18-crown-6 at reducing extractable $Na^+$, $K^+$ and $Cl^-$.

EXAMPLE J (Comparative)

Example G was repeated using a different batch of Epikote 828 (Batch J).

EXAMPLE 7

Preparation: The tetraethyl acetate of 7,13,19,25-tetra-tert-butyl-27,28,29,30-tetrahydroxy-2,3-dihomo-3-oxacalix-4-arene.

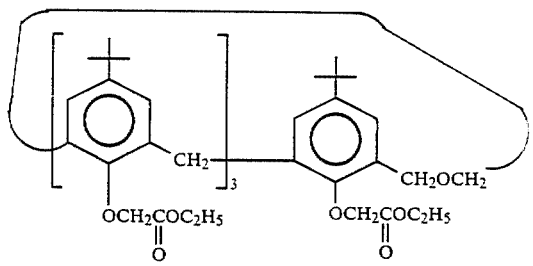

XXI 7,13,19,25-tetra-tert.butyl-27,28,29,30-tetrahydroxy-2,3-dihomo-3-oxacalix-4-arene was prepared following the method of C. D. Gutsche, B. Dhawan, K. H. No., and R. Muthukrishnan, J. Am. Chem. Soc. 103 p 3782 1981 from p-tert-butylphenol, paraformaldehyde and aqueous 5N potassium hydroxide in refluxing xylene. To 3.2 g of this compound (0.0047 mole) in 25 ml analar acetone was added 6.6 g (0.031 mole) ethyl bromoacetate and 4.2 g (0.030 mole) anhydrous potassium carbonate and the entire was refluxed under dry nitrogen with stirring for 120 hours. After this time all volatiles were removed including the excess ethyl bromoacetate under reduced pressure to give a buff coloured solid which was dissolved in 20 ml dichloromethane which was washed 3 times with 20 ml 10% aqueous $H_2SO_4$ and twice with 20 mls water. The separated dichloromethane layer was then dried over dried magnesium sulphate and volatiles were removed to give 4.0 g of product as a pale buff solid of yield 83%, which was chromatographed on acid-washed alumina and dichloromethane as eluent to give, following removal of volatiles, colourless solid tetraethyl acetate of 7,13,19,25-tetra-tert.butyl-27,28,29,30-tetrahydroxy-2,3-dihomo-3-oxacalix-4-arene, m.pt. 63°–64° C., characterised by infra-red spectroscopy and elemental analysis.

I.R. Spectroscopy results: $\gamma 1765$ (S) $cm^{-1}$ C=O.

Elemental analysis results (Calculated for $C_{16}H_{82}O_{13}$: C=71.59, H=8.08, O=20.34; Found: C=71.45, H=7.87, O=20.20).

EXAMPLE 8

To 100 g of Epikote 828 epoxy resin (Batch J) was added 1 g of the oxacalixarene derivative of Example 7. The composition was stirred well in a polyethylene beaker with PTFE-coated stirrer for 17 hours and then the same procedure as in Example 5 was followed.

EXAMPLE 9

Example 8 was followed except 5 g of the oxacalixarene derivative from Example 7 was added instead of 1 g.

TEST RESULTS—TABLE III

The ionic impurities in the products of Examples 8 and 9 were measured following the MIL-A-87172 procedure described above. The following results were obtained:

| | Analysis of Aqueous Samples (p.p.m.) | | | |
|---|---|---|---|---|
| Sample | Additive | Epoxy | $Na^+$ | $Cl^-$ |
| Example G | 0 | Epikote 828 resin | 270 | 5 |
| Example 8 | 1% oxacalixarene derivative | Epikote 828 resin | 17 | <5 |
| Example 9 | 5% oxacalixarene derivative | Epikote 828 resin | 20 | <5 |

As can be clearly seen from the above results, the oxacalixarene derivative is effective at reducing extractable sodium and chloride from cured epoxy resin when used at the above indicated levels.

EXAMPLE K (Comparative)

Example G was repeated using a further batch of Epikote 828 (Batch K).

EXAMPLE 10

Preparation: Diethylamide of p-t-butylpseudocalixarene

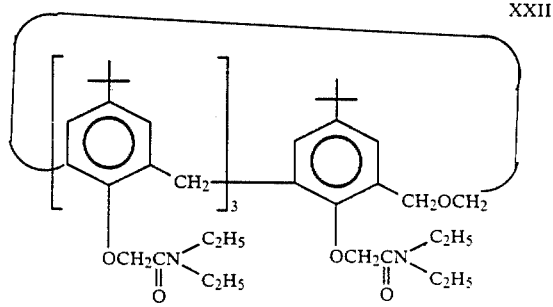

XXII

To 3.84 g p-t-butylpseudocalixarene also called 7,13,19,25-tetra-tert.butyl-27,28,29,30-tetrahydroxy-2,3-dihomo-3-oxacalix-4-arene prepared as in Example 7 (0.0056 mole) in 25 mls dry DMSO was added 4.50 g (0.030 mole) 2-chloro-N,N-diethylacetamide, 2.6 g (0.022 mole) potassium bromide and 5.6 g (0.041 mole) anhydrous potassium carbonate was stirred under nitrogen at room temperature for 72 hours after which the reaction mixture was poured into 3% sulphuric acid to give an off-white precipitate which was washed well with water and dried to give 5.8 g (90%) yield of off-white product. Chromatography through neutral alumina using dichloromethane as eluent gave off-white product m.pt. 111°–114° C. characterised by infra red spectroscopy and elemental analysis.

i.r. spectroscopy results: $\gamma 1652$ cm$^{-1}$ (S) C=O.

Elemental Analysis results (Calc'd for $C_{69}H_{102}N_4O_9$ C:73.24, H:9.09; Found C:73.15, H:8.77).

EXAMPLE 11

To 100 g Epikote 828 epoxy resin (Batch K) was added 1 g of the compound of Example 10. The composition was then stirred well in a polyethylene beaker with PTFE coated stirrer for 17 hours at room temperature, then the same procedure as in Example 5 was followed.

EXAMPLE 12

Example 11 was followed except that 5 g of amide-functional oxacalixarene of Example 10 was used in place of 1 g.

TEST RESULTS—TABLE IV

The ionic impurities in the products of Examples 11 and 12 were measured following the MIL-A-87172 procedure described above. The following results were obtained.

| Sample | Analysis of Aqueous Samples (p.p.m.) | | | | |
|---|---|---|---|---|---|
| | Additive | Epoxy | Na$^+$ | K$^+$ | Cl$^-$ |
| Example K | 0 | Epikote 828 resin | 37 | <5 | <4 |
| Example 11 | 1% amide-functional oxacalixarene derivative | Epikote 828 resin | 20 | <5 | >2 |
| Example 12 | 5% amide-functional oxacalixarene derivative | Epikote 828 resin | 13 | <5 | <3 |

As can be clearly seen the amide functional oxacalixarene is effective at reducing extractable sodium (and potassium and chloride) from cured epoxy resin when used at the above indicated levels. By employing 1% amide functional oxacalixarene, a non-electronic epoxy Epikote 828 had its extractable metal ions reduced down to values expected from a good electronic epoxy resin.

EXAMPLE 13

To 100 g of Epikote 828 epoxy resin (Batch K) was added 1 g of

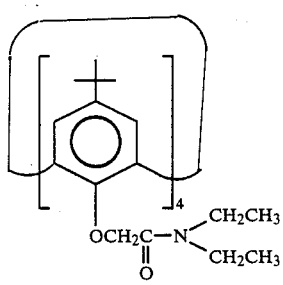

XXIII m.pt. 230°–3° C. prepared following the procedure of G. Calestani J. Chem. Soc. Chem. Commun. 1987 p 344 (published m.pt. 228°–9° C.). The composition was stirred well in a polyethylene beaker with PTFE coated stirrer for 17 hours at room temperature, then the same procedure as in Example 5 was followed.

EXAMPLE 14

Example 13 was followed except that 5 g of the amide-functional calixarene was used in place of 1 g.

TEST RESULTS—TABLE V

The ionic impurities in the products of Examples K, 13 and 14 were measured following the MIL-A-87172 procedure described above.

| Sample | Analysis of Aqueous Samples (p.p.m.) | | | | |
|---|---|---|---|---|---|
| | Additive | Epoxy | Na$^+$ | K$^+$ | Cl$^-$ |
| Example K | 0 | Epikote 828 resin | 37 | <5 | <4 |
| Example 13 | 1% amide-functional calixarene derivative | Epikote 828 resin | 5 | <5 | <2 |
| Example 14 | 5% amide-functional calixarene derivative | Epikote 828 resin | 16 | <5 | <2 |

As can be cleary seen the amide-functional calixarene is effective at reducing extractable sodium (and potassium and chloride) from cured epoxy resin when used at the above indicated levels. The result from use of 1% additive is encouraging, a non-electronic epoxy Epikote 828 having its extractable metal ions reduced down to those of a good electronic epoxy.

EXAMPLE L (Comparative)

Example G was repeated using a further batch of Epikote 828 (Batch L).

EXAMPLE 15

To 100 g of Epikote 828 (Batch L) epoxy resin was added 1 g of 1,1-dimethylsila-17-crown-6 commercially available from Petrarch Systems, Bristol, Pa., U.S.A. The composition was then stirred well in a polyethylene beaker with PTFE-coated stirrer for 10 minutes, then the same procedure as in Example 5 was followed.

EXAMPLE 16

Example 15 was followed except that 5 g of 1,1-dimethylsila-17-crown-6 was added instead of 1 g.

TEST RESULTS—TABLE VI

The ionic impurities in the products of Example L, 15 and 16 were measured following the MIL-A-87172 procedure described above.

| Sample | Analysis of Aqueous Samples (p.p.m.) | | | | |
|---|---|---|---|---|---|
| | Additive | Epoxy | Na$^+$ | K$^+$ | Cl$^-$ |
| Example L | 0 | Epikote 828 Resin | 120 | 5.5 | 5 |
| Example 15 | 1% silacrown | Epikote 828 Resin | 25 | 5 | <3 |
| Example 16 | 5% silacrown | Epikote 828 Resin | 20 | 3 | <3 |

As can be clearly seen from the above table the silacrown is effective at reducing extractable sodium, potassium and chloride from cured epoxy resin when used at the above indicated level.

As can be clearly seen by comparison of Table VI and Table II, the improvements conferred by the silacrown are of the same order conferred by 18-crown-6 and the calixarene derivative of Example 6. The good performance conferred by the silacrown is completely unexpected due to its low sodium ion sequestering ability. (See M. A. McKervey et al J. Chem. Commun. 1985 p. 388). Silacrowns have the advantage of being much less toxic than crown ethers.

EXAMPLE 19

To 100 g of Epikote 828 (Batch L) epoxy resin was added 5 g of triethylene glycol monoethyl ether (98% purity, available from Fluka Chemicals Ltd., Glossop, Derbyshire, England). The composition was stirred well in a polyethylene beaker with PTFE-coated stirrer for ten minutes, then the same procedure as in Example 5 was followed.

TEST RESULTS—TABLE VII

The ionic impurities in the products of Examples L and 17 were measured following the MIL-A-87172 procedure described above. The following results were obtained:

| | | Analysis of Aqueous Samples (p.p.m.) | | | |
|---|---|---|---|---|---|
| Sample | Additive | Epoxy | $Na^+$ | $K^+$ | $Cl^-$ |
| Example L | 0 | Epikote 828 Resin (Shell) | 120 | 5.5 | 5 |
| Example 17 | 5% $HO(CH_2CH_2O)_3CH_2CH_3$ | Epikote 828 Resin (Shell) | 28 | 4 | <3 |

EXAMPLE M (Comparative)

Example G was repeated with a different batch of Epikote 828 epoxy resin (Batch M).

EXAMPLE 18

To 100 g of Epikote 828 (Batch M) epoxy resin was added 1% tris(3,6-dioxaheptyl)amine (an acylic cryptand having the formula

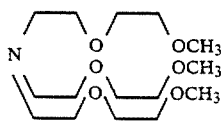

XXIV commercially available under the designation TDA-1 from Rhone-Poulenc, Courbevoie, France) with stirring for 10 minutes, then the same procedure as in Example 5 was followed.

EXAMPLE 19

The same procedure as in Example 18 was followed except that 5% TDA-1 was employed instead of 1%.

EXAMPLE 20

Preparation Ethyl Ether of Triethyleneglycol of p-t-Butylcalix-8-arene

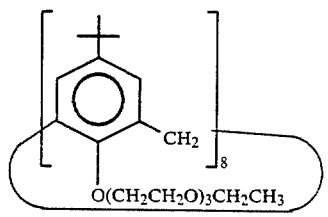

XXV

The tosylate of the ethyl ether of triethylene glycol was prepared by reacting the alcohol with 1.1 equivalents of p tosyl in dry pyridine as a pale yellow oil following the procedure of J. A. Hyatt, J. Org. Chem 43 (9) p. 1808 1978. To 0.97 g (0.00075 mole) of p-t-butylcalix-8-arene in 10 mls dry N-methyl pyrrolidone was added 2.65 g (0.0080 mole) triethylene glycol monoethyl ether p-toluenesulphonate and the reaction mixture was stirred under nitrogen at room temperature for four hours. After this time 0.168 (0.0070 mole) sodium hydride was added to the reaction mixture and the entire was heated 17 hr at 90° C. under nitrogen with rapid stirring. After cooling to room temperature N-methyl pyrrolidone was distilled off under reduced pressure to give a brown sticky solid residue. To this residue was added 20 mls dichloromethane and solid was filtered off to give a clear red brown filtrate which was washed three times with 20 mls 10% aqueous $H_2SO_4$ and once with water following which it was dried over $MgSO_4$. Following solvent removal 1.40 g pale red-brown oil product remained (70%) which on standing partly solidified. The product was chromatographed on acid-washed alumina using dichloromethane as eluent to give pale yellow brown oil which again partly solidified on standing. Infra red spectroscopy revealed it to be the monoethyl ether of triethyleneglycol of p-t-butylcalix-8-arene.

i.r. spectroscopy results: $\gamma 1120$ $cm^{-1}$(S)C-O-C (No $3320 cm^{-1}$ due to C-OH).

This compound and other calixarene polyalkylene glycol derivatives can also be prepared by reaction of phenolic calixarene with epoxide (U.S. Pat. No. 4098717 Jul. 4 1978 by R. Buriks et al, Petrolite Corp.).

EXAMPLE 21

A 1% level of calixarene from Example 20 was added to Epikote 828 (Batch N) resin with stirring as in Example 19 but for 17 hours to ensure complete dissolution and the composition was then treated as in Example 5.

EXAMPLE 24

Example 23 was followed except that a 5% level of calixarene derivative from Example 22 was used in place of 1%.

TEST RESULTS—TABLE VIII

The ionic impurities in Example M, 18, 19, 21 and 22 were measured following the MIL-A-87172 procedure as described above.

The following results were obtained:

| | Analysis of Aqueous Samples (p.p.m.) | | | | |
|---|---|---|---|---|---|
| Sample | Additive | Epoxy | $Na^+$ | $K^+$ | $Cl^-$ |
| Example M | 0 | Epikote 828 Resin | 270 | 7 | 5 |
| Example 18 | 1% TDA-1 | Epikote 828 Resin | 20 | 4.5 | — |

-continued

| | Analysis of Aqueous Samples (p.p.m.) | | | | |
|---|---|---|---|---|---|
| Sample | Additive | Epoxy | Na+ | K+ | Cl− |
| Example 19 | 5% TDA-1 | Epikote 828 Resin | 3–5 | 2 | <3 |
| Example 21 | 1% Calixarene dervivative | Epikote 828 Resin | 17 | <3 | |
| Example 22 | 5% Calixarene derivative | Epikote 828 Resin | 10 | 5.5 | <3 |

As can be clearly seen the polyethylene derivatives are effective at reducing extractable sodium (and potassium and chloride) from cured epoxy resin when used at the above indicated levels.

We claim:

1. An improved curable composition suitable for the encapsulation of electronic devices, said composition comprising a curable epoxy resin and, as the improvement therefor, from 0.5 to 10 percent by weight of a metal ion scavenger effective in reducing the level of metal ion or chloride ion or both metal ion and chloride ion extractables from said composition, said metal ion scavenger selected from the group consisting of (A) Calixarene or oxacalixarene derivatives represented by the formula

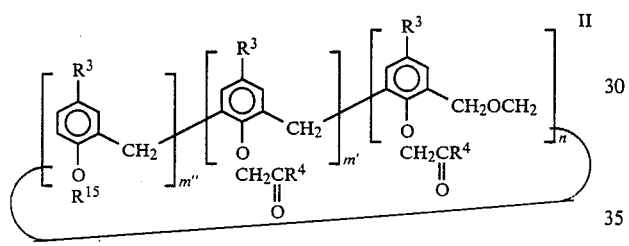

wherein
$m' + m'' = 0-8$;
$n = 0-8$;
$m' \geq \frac{1}{2}(m' + m'')$;
$3 \leq m' + m'' + n \leq 8$;
if $n = 0$, $m' + m'' \geq 4$;
the $R^3$ groups are the same or different and are H, halogen, or hydrocarbyl or a substituted derivative thereof;
$R^4$ is hydrocarbyl, hydrocarbyloxy or a substituted derivative thereof; or $R^4$ is

wherein $R^5$ and $R^6$ are the same or different and are H or hydrocarbyl or a substituted derivative thereof;
$R^{15}$ is H or hydrocarbyl or a substituted derivative thereof;
the calixarene or oxacalixarene derivative being present as a compound per se or being bound into the polymer network of the polymeric material;

(B) Silacrowns represented by the formula

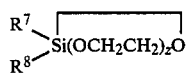

wherein $R^7$ and $R^8$ are the same or different and are hydrocarbyl, hydrocarbyloxy, or a nitrogen-substituted or other substituted derivative thereof; z is 3–6; and (C) polyalkylene ether derivatives represented by the formulae

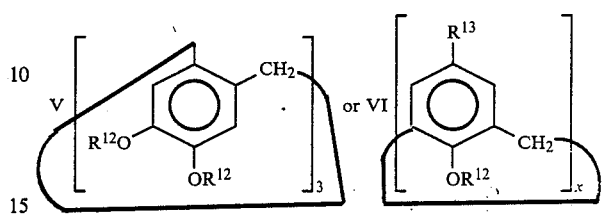

wherein
$R^{12}$ is $-(R^{10}-O)_q-R^{11}$;
$q$ is an integer of from 2 to 25;
$R^{10}$ is a substituted or unsubstituted alkyl residue having 2 to 6 carbon atoms, the $(R^{10}-O)$ groups containing the same alkyl residue or containing different alkyl residues distributed on the chain in a random or block manner;
$R^{11}$ is hydrogen, hydrocarbyl or a substituted derivative thereof;
$R^{13}$ is hydrogen, halogen, or hydrocarbyl or a substituted derivative thereof; and
$x$ is an integer from 4 to 8.

2. A composition according to claim 1 wherein the metal ion scavenger is a compound of formula II wherein $m'' = 0$.

3. A composition according to claim 1 wherein the metal ion scavenger is a calixarene derivative of formula II wherein $n = 0$.

4. A composition according to claim 1 wherein the metal ion scavenger is an oxacalixarene derivative of formula II wherein n is from 1 to 4.

5. A composition according to claim 3 wherein the oxacalixarene of formula II is selected from the group consisting of (i) an oxacalix-4-arene of formula

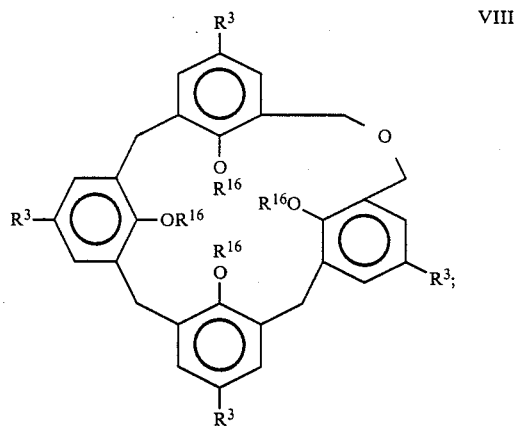

(ii) a dioxacalix-4-arene of formula

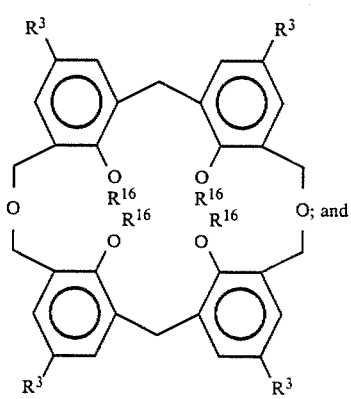

(iii) a trioxacalix-3-arene of formula

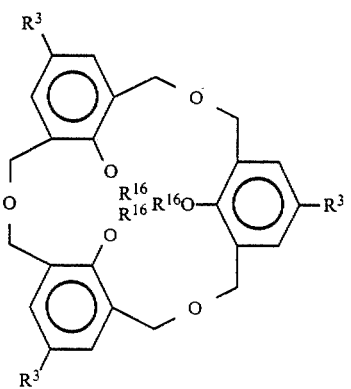

wherein $R^{16}$ is $CH_2C(O) R^4$;

$R^3$ is H, halogen, or hydrocarbyl or a substituted derivative thereof, and $R^3$ may be the same or different on each aryl group; and $R^4$ is hydrocarbyl, hydrocarbyloxy or a substituted derivative thereof; or $R^4$ is IX 

wherein $R^5$ and $R^6$ which may be the same or different are H or hydrocarbyl or a substituted derivative thereof.

6. A composition according to claim 1 wherein the metal ion scavenger is a silacrown selected from the group consisting of
1,1-dimethylsila-11-crown-4,
1,1-dimethylsila-14-crown-5, and
1,1-dimethylsila-17-crown-6.

7. A composition according to claim 1 wherein the metal ion scavenger is a compound of formula V or VI in which q is an integer from 2 to 6.

8. A composition according to claim 1 wherein the metal ion scavenger is present in an amount of from 1 to 5% by weight based on the weight of the polymeric material.

9. An improved curable composition suitable for the encapsulation of electronic devices, said composition comprising a epoxy resin and, as the improvement therein, an effective metal or chloride ion scavenging amount of a calixarene derivative represented by the formula:

X 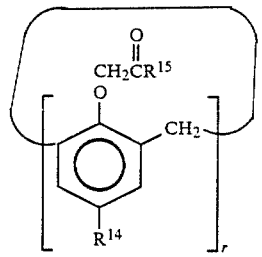

wherein $R^{14}$ is H, hydrocarbyl or a substituted derivative thereof, $R^{15}$ is hydrocarbyl, hydrocarbyloxy or a substituted derivative thereof; and r is 4, 6 or 8.

10. A composition according to claim 1 wherein the hydrocarbyl group of $R^3$, $R^4$, $R^5$, $R^6$, $R^7$, $R^8$, $R^{11}$ or $R^{15}$ and the hydrocarbyloxy group of $R^4$, $R^7$ or $R^8$ contains from 1 to 10 carbon atoms if non-aryl containing and from 6 to 20 carbon atoms if aryl or aryl containing.

11. A composition according to claim 10 wherein the hydrocarbyl group is an alkyl or alkenyl group.

* * * * *

UNITED STATES PATENT AND TRADEMARK OFFICE
CERTIFICATE OF CORRECTION

PATENT NO. : 4,908,399
DATED : March 13, 1990
INVENTOR(S) : Harris et al

It is certified that error appears in the above-identified patent and that said Letters Patent is hereby corrected as shown below:

The figure in the ABSTRACT is incorrect.

Delete:

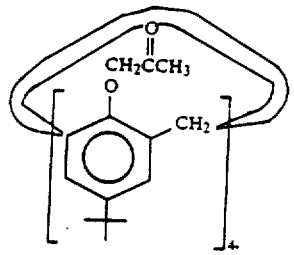

UNITED STATES PATENT AND TRADEMARK OFFICE
CERTIFICATE OF CORRECTION

PATENT NO. : 4,908,399

DATED : March 13, 1990

INVENTOR(S) : Harris, et al

It is certified that error appears in the above-identified patent and that said Letters Patent is hereby corrected as shown below:

and insert:

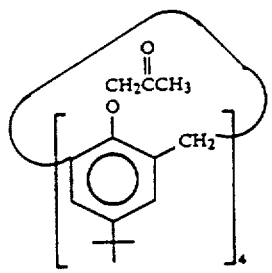

Signed and Sealed this

Twelfth Day of March, 1991

*Attest:*

HARRY F. MANBECK, JR.

*Attesting Officer*  *Commissioner of Patents and Trademarks*